Aug. 12, 1952     W. BERTHELSEN     2,606,657
BOTTLE TESTING AND SORTING APPARATUS
Filed Feb. 6, 1948     5 Sheets-Sheet 1

Fig. 1

INVENTOR.
Walter Berthelsen
BY J. Stanley Churchill
ATTORNEY

Aug. 12, 1952     W. BERTHELSEN     2,606,657
BOTTLE TESTING AND SORTING APPARATUS Filed Feb. 6, 1948                               5 Sheets-Sheet 2

INVENTOR.
Walter Berthelsen
BY
J. Stanley Churchill
ATTORNEY

Aug. 12, 1952

W. BERTHELSEN 2,606,657

BOTTLE TESTING AND SORTING APPARATUS

Filed Feb. 6, 1948

INVENTOR.
Walter Berthelsen
BY
J. Stanley Churchill
ATTORNEY

Patented Aug. 12, 1952

2,606,657

UNITED STATES PATENT OFFICE 2,606,657

BOTTLE TESTING AND SORTING APPARATUS

Walter Bertheisen, Quincy, Mass., assignor to Pneumatic Scale Corporation Limited, Quincy, Mass., a corporation of Massachusetts Application February 6, 1948, Serial No. 6,622

7 Claims. (Cl. 209—75)

This invention relates to bottling apparatus.

One object of the invention is to provide a bottling line embodying at least one machine for cleaning, filling or capping bottles and embodying conveying mechanism for supplying a line of bottles into the machine and for discharging the same therefrom, wherein provision is also made for testing the bottles prior to and preferably as they are supplied to the bottling machine or machines to detect those bottles having physical defects of sufficient magnitude to render them incapable of passage through the machine or machines without substantial liability of smashing the bottles, jamming the conveying mechanism, or injuring the bottle handling portions of the machine, and wherein provision is made for rejecting such abnormal bottles while permitting the normal bottles to continue through the bottling line.

A further object of the invention is to provide novel and improved bottle testing apparatus for testing a series of bottles fed thereto and for separating those bottles having defects of sufficient magnitude to interfere with the successful operation of standard bottling apparatus.

With these general objects in view, and such others as may hereinafter appear, the invention consists in the bottling apparatus, and in the various structures, arrangements and combinations of parts hereinafter described and particularly defined in the claims at the end of this specification.

In the drawings illustrating the preferred embodiment of the invention.

In the operation of bottling apparatus wherein the glass containers are automatically conveyed in succession between guide rails, transferred to and from the different operating devices by synchronous transfer spiders having container engaging portions conforming substantially to the shape of the containers, and wherein the bottling apparatus is provided with supporting and operating devices engageable either with the body portion, or top and extendable into the interior of the container, it is necessary that the successive containers be substantially uniform as to size and shape and free from such defects which might cause breakage of the glass containers or injury or damage to the rigid container handling elements of the bottling apparatus.

Some of the defects and imperfections which may occur in the glass containers include misshaped or deformed containers. Such deformities may take the form of bulges in the side walls of the body of the container; sagging or disaligned neck portions; imperfect neck openings or choke necks; irregular or rounded bottoms causing leaning of the container; non-uniformity in height; leaky containers; and various other defects and irregularities, any or all of which may contribute to imperfect handling or which may cause jamming of the containers in the bottling apparatus, and possible failure or breakage of the various devices thereof.

In accordance with the present invention a novel bottle testing apparatus is inserted in the bottling line in advance of one or more bottling machines for performing operations of cleaning, filling or capping the bottles, and such bottle testing apparatus is arranged to detect those bottles having physical defects of sufficient magnitude to render them incapable of passage through the subsequent bottling apparatus in the line without substantial liability of smashing the bottles, jamming the conveying mechanism, or injuring the bottle handling portions of the machine. Provision is also preferably made for rejecting such abnormal bottles before the same are conveyed into the bottling machine to the end that the bottling line may operate in a continuous and trouble-free manner with maximum protection and efficiency.

Figure 1:
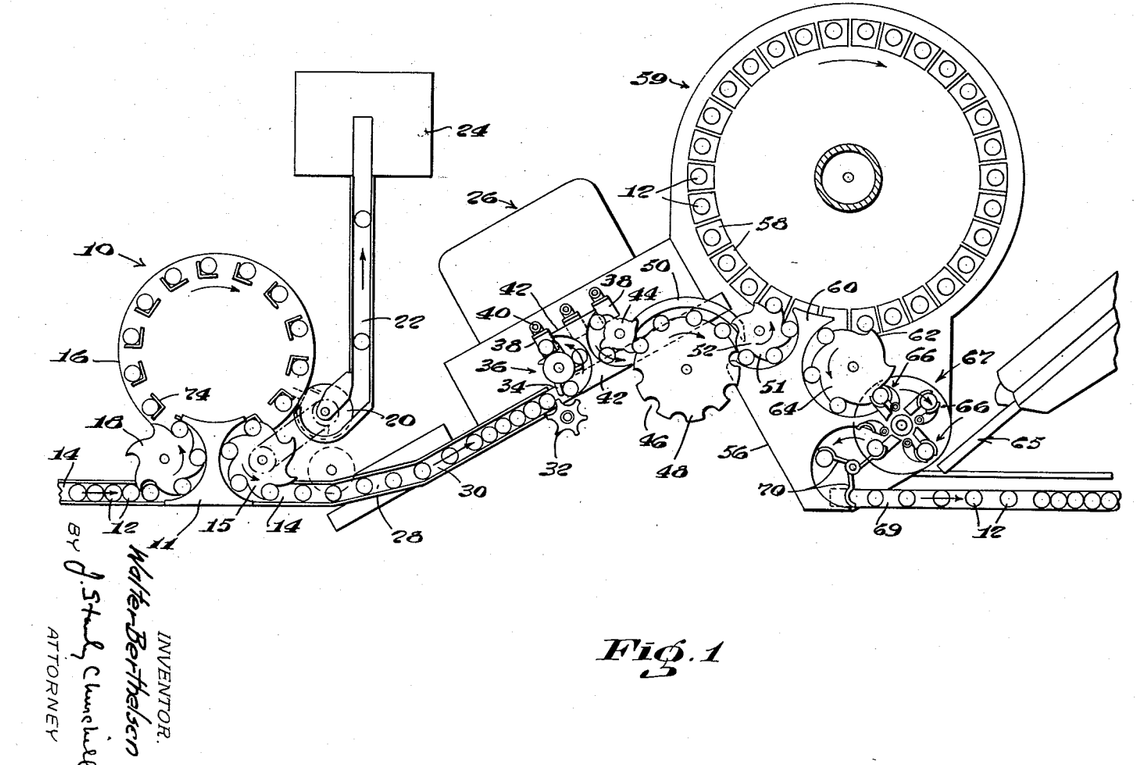
Fig. 1 is a plan view of bottling apparatus embodying the present invention.

Referring now to the drawings, in general, the illustrated bottling apparatus, diagrammatically shown in Fig. 1, includes a rotary bottle testing machine, indicated generally at 10, arranged to receive the bottles 12 being supplied thereto on a continuously moving supply belt 14, successive bottles being transferred from the belt 14 to the rotary table 16 of the testing machine by a transfer spider 18. In their progress through the testing machine, the bottles are tested for the various defects above noted and those bottles found to deviate from a predetermined standard are discharged onto a turntable 20 arranged to transfer the defective bottles onto a conveyer 22 which carries the bottles onto a discharge table 24.

Those bottles which are found to meet the prescribed tests are transferred from the rotary table 16 onto the delivery end of the supply belt 14 by a transfer spider 15 and are guided by rails 28 onto a continuously moving conveyer 30 on which the tested bottles are carried to a bottle cleaning machine, indicated generally at 26. A guide plate 11 supported between the spiders 18, 15 is provided with arcuate cutouts arranged to cooperate with the spiders in guiding the bottles into and out of the testing machine.

The foremost bottle in the line approaching the cleaning machine is engaged by a continuously driven rotary star wheel 32 provided with a plurality of preferably equally spaced teeth arranged to enter between successive bottles as they are delivered and to release such bottles in timed relation to the bottle cleaning machine. The bottles thus released are presented into the path of arms 34 of a rotary feeding device, indicated generally at 36, which operates to transfer successive bottles onto the platforms 38 of successive supporting brackets 40 forming a part of the bottle cleaning machine, the bottles being guided onto the platforms by a guide rail or plate 42, as shown.

The container cleaning machine, herein diagrammatically illustrated, may and preferably will comprise a pneumatic cleaning machine of the type illustrated and described in the United States Patent No. 2,354,308 issued to A. C. Everett, July 25, 1944 to which reference may be had for a more complete disclosure of the machine and the mode of operation thereof. Accordingly, only sufficient portions of such machine are herein illustrated and described as will enable the present invention to be understood.

In general, in such cleaning machines provision is made for presenting successive bottles in radial alignment with individual cleaning nozzles on a rotatable supporting member or carrier by which the bottles are rotated into an inverted position. During the progress of the bottles into and from an inverted position provision is made for extending the cleaning nozzles into the bottles and injecting a stream of air into the interior thereof to effect discharge of dust and foreign particles through the mouth of each bottle, the dust being carried away to a dust collector.

Upon being cleaned, the bottles are removed from the platforms 38, as they arrive at the discharge station, by the engagement of the bottle with an extended portion of the guide rail 42 and successive bottles thus removed are transferred by a rotary toothed wheel 44 into successive equally spaced arcuate pockets or cutouts 46 of a rotary transfer member 48, the pockets being shaped to conform substantially to the shape of the bottle being transferred. The transfer member 48 is arranged to cooperate with a stationary guide rail 50 to guide and convey the bottles into the path of successive arms 51 of a rotary intake spider 52 arranged to dispose successive bottles upon successive continuously moving elevating platforms 58 forming a part of the bottle filling machine, indicated generally at 59.

The bottle filling machine as herein diagrammatically illustrated may and preferably will comprise a rotary vacuum filling machine of the type illustrated and described in the United States patent to A. C. Everett, No. 2,136,421, issued November 15, 1936, to which reference may be had for a more complete description of the construction and mode of operation of such filling machines, only sufficient portions thereof being herein illustrated and described as will enable the present invention to be understood. In general, such filling machines are provided with a plurality of filling heads each provided with a filling nozzle extendable into the mouth of the bottle, and a sealing collar for sealing the mouth of the bottle. The filling heads are arranged to fill the bottles during the continuous movement of the filling heads and of the bottles, as the latter are supported upon the continuously moving bottle supporting and elevating platforms 58, the containers being elevated into operative engagement with the nozzles during this time and the filling operation being effected by the evacuation of the bottle when the latter is elevated into engagement with a filling head. The filling is effected in accordance with the well known vacuum principle.

After being filled the bottles are guided off the supporting platforms 58 of the filling machine by the engagement of successive containers with an extended portion 60 of the guide plate 56 and are engaged by successive arms 62 of a continuously rotated spider or transfer member 64 arranged to transfer the bottles directly from the filling machine into the clamping jaws 66 of a rotary closure applying machine indicated generally at 67.

The closure applying machine 67 herein diagrammatically illustrated may and preferably will comprise a rotary machine of the type illustrated and described in the United States Patent to Everett, No. 2,082,048 issued June 1, 1937 to which reference may be had for a complete disclosure of the structure and mode of operation of such a machine. In general, such a machine is arranged to apply screw closures or caps to the bottles and is provided with a plurality of successive clamping jaws 66 shaped to substantially fit about the body of the bottle and forming part of a revoluble closure applying mechanism having a plurality of rotatable applying devices arranged to receive successive closures supplied by a cap feeding mechanism, indicated generally at 65, and adapted to effect the application of the closure to the bottles held by the clamping jaws during the movement of the bottles through the machine. After being provided with a closure, the filled and closed bottles are transferred from the closure applying machine 67 onto a continuously moving conveyer 69 by transfer arms 70 of a transfer mechanism arranged to remove the bottles in timed relation to the operation of the capping machine and to deposit the bottles onto the conveyer 69. The bottles deposited on the conveyer 69 may be carried to a packing station, or, if labels are to be applied, the bottles may be conveyed to a labeling machine, not shown, forming a part of the bottling line. In practice, the rotating closure applying devices are arranged to operate upon bottles of substantially uniform height and bottles having straight neck portions substantially in alignment with the vertical axis of the bottle.

From the description thus far it will be seen that the general structure and arrangement of the apparatus making up the bottling line are such as to be operative upon bottles of substantially uniform size and shape and bottles free from other defects or imperfections, and, in the event that a defective bottle is permitted to enter the bottling line, trouble may occur at any of several points according to the particular bottle defect. For example, should the body portion of the bottle be deformed or bulged out so as to be larger than a predetermined standard size, jamming of the bottle may occur at any of the transfer points for the reason that the transfer members are designed for cooperation with substantially uniform shapes of bottles. Also, if a bottle is tilted or deformed so as to throw the neck portion out of alignment with the vertical axis of the bottle, or, if the neck is undersized or choked, those operating members designed for cooperation with the top, mouth or neck portions may become jammed or fail to operate successfully. Accordingly, provision is made for testing the bottles for deformities in height, size and shape, and also for their adaptability to permit the mouth of the bottle to be sealed. Provision is also made in the preferred embodiment of the invention for testing the bottles for leakage preferably by means adapted to detect those bottles incapable of maintaining a predetermined pressure applied thereto. Provision is further made for rejecting those bottles found to be defective in any of the respects which would damage the machines, including control mechanism responsive to the testing mechanism arranged to effect rejection of defective bottles in the supply line thus preventing such bottles from entering the operating mechanism of the bottling apparatus.

Figure 2:
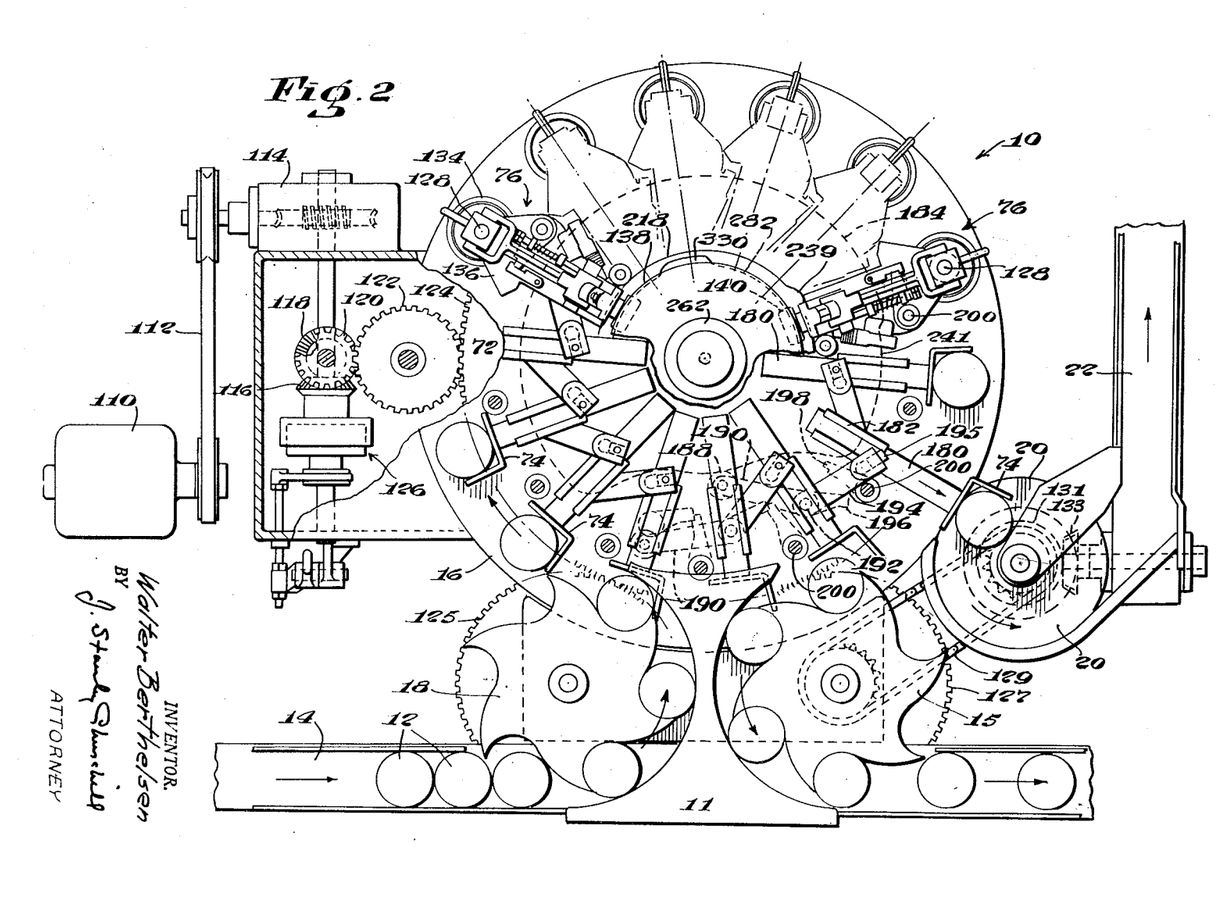
Fig. 2 is a plan view of the bottle testing machine embodied in the present apparatus, some of the parts being broken away and shown in cross section.
Figure 3:
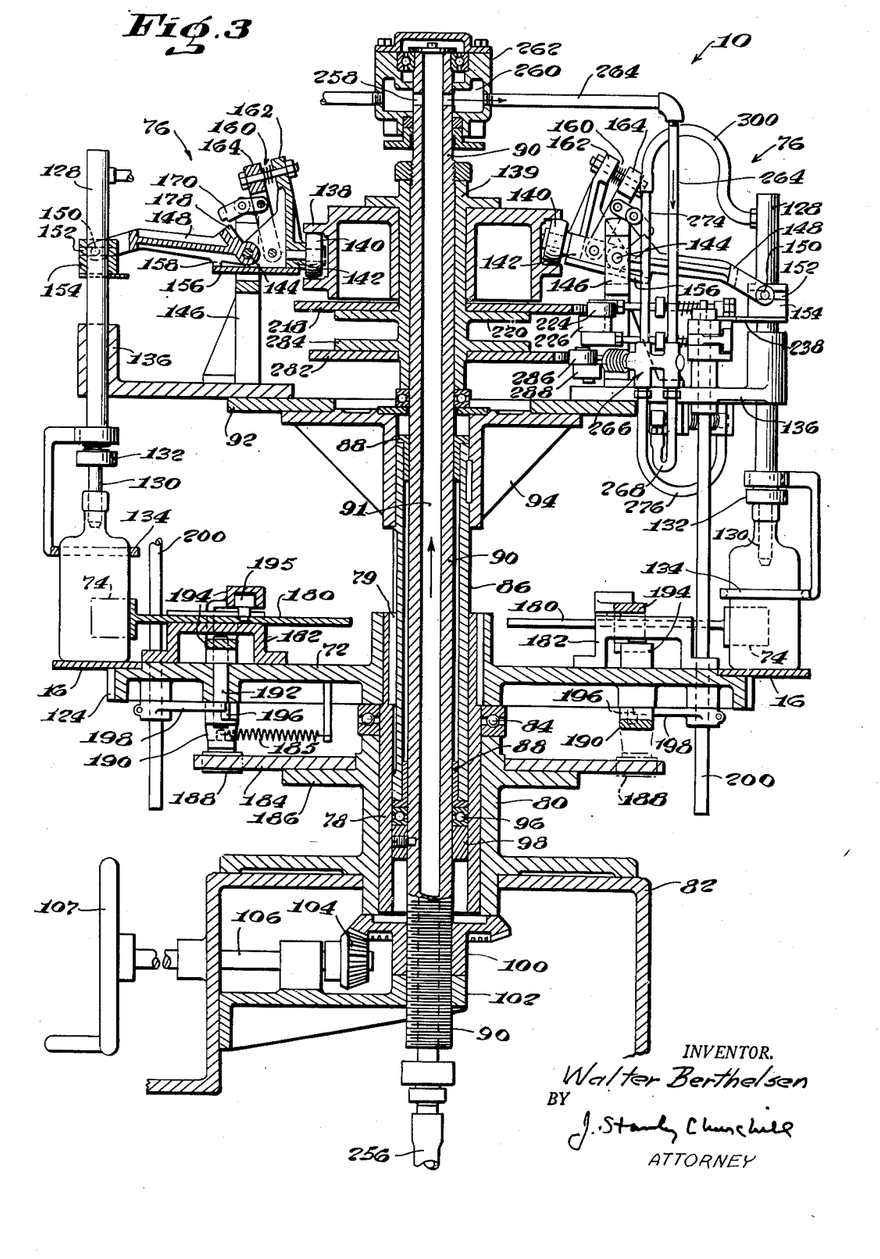
Fig. 3 is a side elevation of the testing machine shown in longitudinal cross section.

Referring now to Figs. 2 and 3, the bottles are arranged to enter the testing mechanism on the supply conveyer 14 and are transferred by the spider 18 onto an annular platform 16 mounted on a rotary carrier 72. The bottles transferred to the platform 16 are arranged to be engaged by successive radially arranged carrier or pusher arms 74 also mounted on the rotary carrier 72, the carrier arms 74 being preferably shaped to engage the bottle on two sides and to align the same vertically with one of a series of individual radially arranged testing units, indicated generally at 76. The testing units 76 are also arranged to move through a circular path with the bottles about the axis of the bottle testing machine 10 during the operation of the machine.

As illustrated in Fig. 3, the rotary carrier 72 is keyed to an outer sleeve 78 rotatably mounted in a central bearing member 80 attached to the machine frame 82. A ball thrust bearing 84 may be provided between the upper surface of the stationary bearing 80 and the under surface of the rotary carrier. The outer sleeve 78 is in turn keyed to an elongated inner sleeve 86 provided with bushings 88 at either end and arranged to rotate about the central stationary shaft or axis 90. The individual testing units 76 are mounted on an annular supporting member 92 carried by a bracket 94 fast on the upper end of the elongated sleeve 86, as illustrated. The lower end of the elongated sleeve 86 is arranged to rest on a ball thrust bearing 96 supported on a collar 98 secured to the stationary central shaft 90.

With this construction provision may be made for vertically adjusting the inner elongated sleeve 86 and the testing units 76 mounted thereon relative to the outer sleeve 78 and the rotary bottle supporting platform 16, the keyed connection 79 permitting vertical slidable movement of the inner sleeve relative to the outer sleeve. As herein shown, vertical adjustment may be effected by raising or lowering the central non-rotatable shaft 90, the latter being threaded at its lower end and arranged to cooperate with an interiorly threaded bevel gear nut 100 supported on a bracket 102 attached to the machine frame. A second bevel gear 104 arranged to mesh with the bevel gear 100 is mounted fast on one end of a shaft 106 rotatably supported in the frame, the other end of the shaft being provided with a handwheel 107. Thus, in operation, rotation of the bevel gear nut 100 effects raising or lowering of the central stationary shaft 90 and the rotatable inner sleeve mounted thereon thereby adjusting the upper section of the machine including the testing units 76 relative to the annular bottle supporting carrier to accommodate bottles of varying heights.

As shown in Fig. 2, the rotary carrier 72 and associated mechanism of the testing machine is arranged to be rotated by a motor 110 and through connections including a belt connection 112 to a worm and worm wheel speed reducing unit 114, bevel gears 116, 118, and spur gears 120, 122, the latter meshing with gear teeth 124 formed on the carrier 72. A manually controlled clutch, indicated generally at 126 may be provided for engaging and disengaging the drive to the carrier. The intake spider 18 and the delivery spider 15 may and preferably will be driven by gears 125, 127 respectively, arranged to cooperate with the gear teeth 124 of the carrier 72, and, the turntable 20 for the rejected bottles may be connected to the delivery spider 15 by a chain and sprocket drive 129. The discharge conveyer 22 may be driven from the turntable through cooperating bevel gears 131, 133, as shown in Fig. 2.

In the operation of the testing apparatus, during the progress of the bottles through the bottle testing machine 10, each bottle is arranged to be tested by its individual testing unit 76 disposed in vertical alignment therewith, and, in the event that a bottle is found to be defective in any of the respects for which the testing mechanisms are designed to test, provision is made for rejecting the defective bottles onto the turntable 20 through connections responsive to the testing units and adapted to effect radial extension of the carrier or pusher arms 74, as will be hereinafter more fully described.

Figures 4, 5:
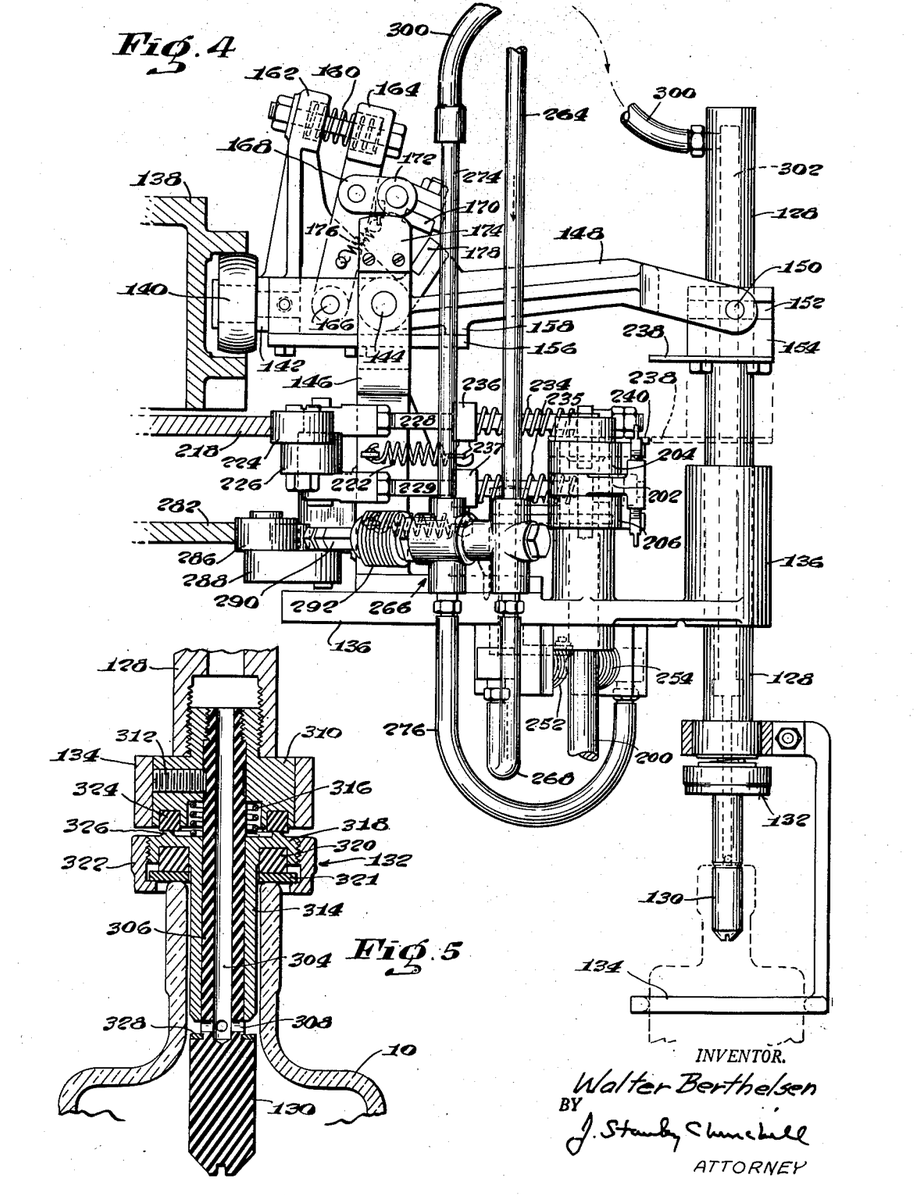
Fig. 4 is a side elevation of a bottle testing unit embodying the present invention.
Fig. 5 is a cross sectional detail view of a portion of the testing unit shown in operative engagement with a bottle to be tested.

Referring now to Figs. 3 and 4, each bottle testing unit 76 includes a vertically reciprocal, non-rotatable testing spindle 128 having a head portion 130 capable of entering the neck portion of an acceptable bottle aligned therewith; a sealing collar 132 arranged to engage the mouth portion of the bottle when the head portion is permitted to enter the neck; and a bottle gauging member 134 mounted on and movable with the spindle and arranged to pass down over the top of the bottle to gauge the body portion thereof.

Each spindle 128 is slidably mounted in a bracket 136 attached to the annular supporting member 92 and the spindle is arranged to be reciprocated through connections from a stationary barrel cam 138 adjustably secured to a flanged sleeve 139 mounted on the stationary central shaft 90. As best shown in Fig. 3, the cam 138 has a cam roller 140 cooperating therewith, the roller being carried by an arm 142 pivotally mounted on a pin 144 in a standard 146 attached to the bracket 136. A second arm 148 loosely pivoted on the pin 144 is yoked at its outer end and provided with opposed inwardly extended pins 150 arranged to engage in opposed grooved portions 152 formed in a block 154 which is secured to the spindle 128. The roller arm 142 is provided with an extended plate 156 against which a depending portion 158 of the spindle arm 148 engages to support the weight of the arm. In operation, when the roller arm 142 is rocked upwardly, the spindle arm 148 is permitted to rock downwardly by the weight of the arm itself and the spindle supported thereby.

Thus, the initial downward movement of the spindle 128 is effected by gravity so that in the event that descent of the spindle is obstructed by a defective bottle, it will remain in its stopped position while the cam roller arm continues its full stroke. The spindle may be interrupted in its descent by any of the various defects which are encountered in practice and which render the bottle unfit to pass through the bottling line. For example, if the body portion of the bottle is deformed or varies substantially from a standard cross sectional shape, such as might be caused by bulges in the side walls thereof, the gauging member 134 will terminate the descent of the spindle when it engages such deformed portion; if the bottle is tilted or if the neck portion is not in vertical axial alignment with the body portion, the end or head portion 130 of the spindle will strike the edge of the bottle mouth and thus retain the spindle in its raised position; or, in the event that the interior of the neck portion is below a predetermined size or is provided with an obstruction, the head portion 130 will be prevented from entering the bottle and thus effect termination of the descent of the spindle. Provision is made, as will be hereinafter described, for rejecting the bottle when the spindle fails to descend.

However, if the bottle passes these tests, the spindle is permitted to descend freely into the bottle by gravity until the sealing member 132 rests against the mouth of the bottle. Thereupon, provision is made for positively urging the spindle downwardly to force the sealing member 132 into air tight sealing relation with respect to the mouth of the bottle. As herein shown, this may be accomplished through cooperating linkage between the arms 142, 148 arranged to become operative only when the spindle has descended to a predetermined position. The cooperating linkage includes a yieldable connection comprising a spring 160 interposed between an arm 162 extended from the roller arm 142, and a link 164 pivotally mounted at 166 in the arm 142. The link 164 is provided with an arm 168 pivoted thereon and having a latch 170 at its outer end and a roller 172 intermediate its ends. The roller 172 is arranged to cooperate with a cam piece 174 attached to the upper portion of the standard 146, the roller being held against its cam by a spring 176.

The latch 170 is arranged to cooperate with a latch member 178 carried by the spindle arm 148 to thus effect positive pressure of the sealing member against the mouth of the bottle when permitted to do so by the cam piece 174. The cam piece is designed to hold the arm 168 in a raised position to prevent engagement of the latch 170 with the member 178 until the spindle has been lowered to a predetermined position corresponding to the engagement of the sealing member 132 with the mouth of the bottle. In the event that the spindle should be stopped in its descent before reaching such predetermined position, the upraised latch 170 will pass over the upper end of the latch member 178 permitting the cam urged linkage to complete its stroke without effecting pressure against the spindle arm 148. However, if the spindle is permitted to descend until the sealing member 132 engages the bottle, the latch 170 will be permitted to drop into latching engagement with the member 178 and positively urge the member 132 into sealing engagement with the bottle. On the return stroke the spindle arm 148 is positively rocked upwardly by the engagement of the plate extension 156 with the under side of the spindle arm, as illustrated. During the progress of the bottles through the machine, while thus sealed, the bottles are tested for leakage and those bottles found to be leaky may and preferably will be rejected as will be hereinafter described.

From the description thus far it will be observed that the bottles may be tested for deformities in shape, in neck structure and for leakage during their progress through the machine, and provision is made for rejecting those bottles found to be defective in such respects or any of them. Referring now to Figs. 2 and 3, each testing unit is provided with its individual rejecting mechanism adapted to extend its carrier member 74 radially to discharge defective bottles onto the turntable 20, and as herein shown, each carrier member is attached to the end of an arm 180 slidably mounted in a bracket 182 attached to the rotary carrier 72. The slide arm 180 is arranged to be extended and retracted in the bracket 182 by a stationary cam 184 adjustably secured to the flanged portion 186 of the bearing member 80 and through connections including a cooperating cam roll 188 carried by an arm 190 fast on the lower end of a vertical stud 192 journaled in the rotary carrier 72. A second arm 194 fast on the upper end of the vertical stud 192 is operatively connected to the slide arm 180 by a slidable connection including a block 195 pivotally carried in the slide arm 180 arranged to cooperate with the slotted end of the arm 194. Each arm 190 is urged in a direction to permit the roll 188 to follow its cam 184 by a spring 185.

Provision is made for normally maintaining the slide arm 180 in its retracted position against the tension of the spring 185, and, as herein shown, the arm 190 is provided with a latch member 196 formed integrally therewith and arranged to cooperate with a latch 198 carried at the lower end of an elongated vertical control shaft 200. The latch 198 and shaft 200 comprise a part of the control mechanism actuated by the detecting mechanism for releasing the arm 190 to permit it to follow the cam 184 and effect rejection of a bottle when the latter is found to be defective. Thus, in operation, when a defective bottle is detected, the elongated vertical shaft 200 is permitted to rock clockwise viewing Fig. 2 to release the latch member 196 and permit operation of the rejecting mechanism. When an acceptable bottle passes through the machine, the latch members 196, 198 are retained in locked position.

Figure 6:
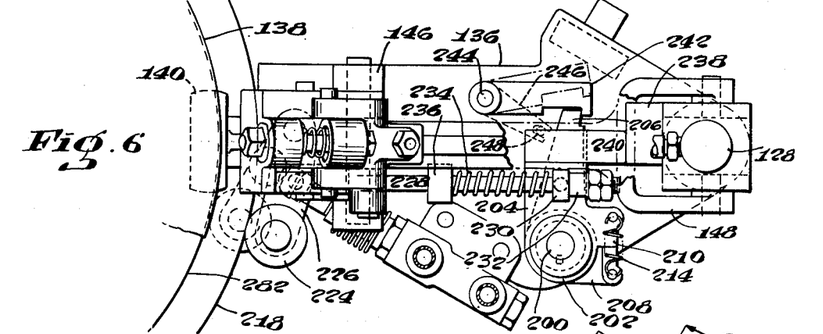
Fig. 6 is a plan view of the testing unit shown in Fig. 4.
Figure 7:
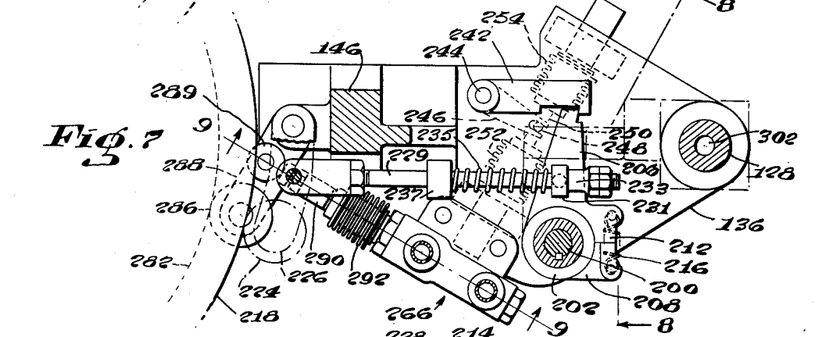
Fig. 7 is a view similar to Fig. 6 with some of the parts removed and with parts shown in cross section.

Referring now to Figs. 4, 6, and 7, the control mechanism for releasing the rejecting mechanism in the event that a defective bottle is detected comprises an arm 202 keyed to the upper end of the elongated vertical shaft 200 and two cam operated latch arms 204, 206 loosely mounted on the shaft 200 above and below the arm 202 respectively. Either or both of the loosely mounted arms 204, 206 are arranged to engage and rock the arm 202 and the shaft 200 in a clockwise direction viewing Figs. 6 and 7, when a defective bottle is detected, the upper arm 204 being rocked to effect release of the rejecting mechanism when the spindle 128 fails to descend a predetermined distance, and the lower arm 206 being likewise rocked to effect such release when a leaky bottle is detected.

The intermediate arm 202 keyed to the shaft 200 is provided with a lateral extension 208 arranged to cooperate with similar opposed lateral extensions 210, 212 formed on the upper and lower latch arms 204, 206 respectively and similar springs 214, 216 connected between the arm 202 and the arms 204, 206 respectively are arranged to urge the parts into cooperative engagement so as to move as a unit when no resistance to clockwise rocking movement is applied to either of the loosely mounted arms 204, 206. However, if resistance to such rocking movement of one of the arms 204 or 206 occurs, the other arm may move freely to effect rocking of the arm 202 by virtue of the spring connections 214, 216.

The arms 204, 206 are arranged to be rocked by a single cam 218 adjustably mounted on a flange portion 220 of the sleeve member 139 secured to the central stationary shaft 90 the arms being rocked by the cam through connections including a cooperating cam roll 224 carried by an arm 226 pivotally mounted in the bracket 146. The cam roll arm 226 is connected to the upper and lower arms 204, 206 by similar connections, comprising rods 228, 229 each pivotally connected to the arm 226 at one end, the other ends being slidingly received in swivel members 230, 231 carried by the arms 204, 206 respectively. Adjustable collars 232, 233 on the end of the rods 228, 229 are arranged to cooperate with their respective swivel members 230, 231 to limit the clockwise movement of the arms 204, 206 and to effect positive retraction or counterclockwise movement thereof. Each rod 228, 229 is provided with a spring 234, 235 interposed between the other side of its swivel and collars 236, 237 adjustably secured to the rods to permit each rod to slide through its swivel when the respective arm 204, 206 is prevented from rocking. Each rod 228, 229 is further provided with a spring 222 connected between the collars 236, 237 and the standard 146 to urge the roller 224 against its cam 218.

Provision is made for preventing clockwise rocking movement of the arms 204, 206 and release of the rejecting mechanism when an acceptable bottle is presented to a testing unit and, as herein shown, when the spindle 128 is permitted to descend into the bottle to a predetermined position, a stop plate 238 carried by the spindle is arranged to come into edgewise alignment with a corresponding stop plate 240 carried by the upper arm 204. Thus, during the progress of the testing unit and the bottle through a circular path, when it is attempted to rock the upper arm 204 to test the extent of descent of the spindle, the stop plate 238 in alignment with the stop plate 240 will prevent rocking of the arm 204 and, its yieldably connected rod 228 will be extended through the swivel member 230. However, in the event that the spindle fails to descend to said predetermined level because of a defective bottle, or, if the spindle is permitted to drop to a level lower than said predetermined level, indicating that the bottle is shorter than a standard height, the stop plate 238 on the spindle will not be in alignment with the plate 240 and the arm 204 will be rocked to effect release of the rejecting mechanism by unlocking the latch members 196, 198 and permitting the arm 190 and roller 188 to follow the cam 184 and effect rejection of the bottle when it arrives adjacent the discharge turntable. In practice, the arms 204, 206 are actuated by the testing cam 218 to effect rocking of the shaft 200 and unlocking of the latch members 196, 198, in the event of a defective bottle, at a point in the cycle indicated at 239 in Fig. 2 just prior to the rejecting station or turntable 20 and at this point the stationary rejecting cam 184 is provided with a slightly depressed portion 241 sufficient to permit the latch 196 to free itself from the latch 198 when permitted to do so by the testing mechanism. Thereafter in the operation of the machine, the spindle is elevated and the rejecting mechanism is operated to discharge a defective bottle onto the turntable 20. The testing mechanism is subsequently reset by retraction of the slide arm 180 to again effect latching engagement of the members 196, 198, the latter being normally urged in counterclockwise direction by virtue of the springs 214, 216 connected between the arm 202 and the latch arms 204, 206 when the latter are retracted to their normal position by the prings 222.

The description of the bottle testing mechanism thus far has been confined, in general, to the detection and rejection of bottles having defects other than leakage. In accordance with the present invention provision is also made for detecting and rejecting a bottle found to be unable to maintain a predetermined pressure applied thereto after being sealed and includes control mechanism actuated by the bottle pressure for either preventing or permitting release of the rejecting mechanism in accordance with the pressure maintained in the bottle.

Referring now particularly to Fig. 7, the leak detecting and control mechanism includes the lower cam operated latch arm 206 which is arranged to be engaged by a latch member 242 to prevent operation of the bottle rejecting mechanism when a predetermined pressure is maintained in the bottle being tested, and, to permit operation thereof when a pressure loss is detected in the bottle. As herein shown, see Fig. 8, the latch member 242 is fast on the upper end of a vertical stud 244 rockingly mounted in the bracket 136. The lower end of the vertical stud is provided with a slotted arm 246 arranged to embrace an upstanding pin 248 carried by a tie rod 250 attached to and extended between the inner faces of opposed flexible air bellows 252, 254. The bellows 252, 254 are adapted to be extended or retracted in accordance with the pressure applied thereto, so that if the pressure in one of the bellows overcomes that in the other the tie rod is moved therewith to effect rocking of the latch member 242. One of the bellows 252 is arranged to be supplied with a substantially constant and uniform air pressure from a suitable source and the other bellows 254 is connected to the sealed bottle being tested and is initially supplied with air at a corresponding or equal pressure. In operation, the initially supplied air pressure in the bellows 254 is thereafter cut off and the pressure therein is subsequently compared with the constant pressure in the bellows 252 to determine if an loss in pressure has occurred during the interval between the initial air supply and the testing point in the cycle of operation. Thus, in operation if no leakage from the bottle has occurred the opposed bellows will apply equal force against the ends of the tie rod 250 so as to maintain the upstanding pin 248 in a central position, as shown in Figs. 6 and 7, thus maintaining the latch member 242 in engagement with the latch arm 206 to prevent operation of the rejecting mechanism. In the event that leakage occurs in the bottle due to pin holes, cracks or imperfect sealing at the mouth portion, the reduced pressure in the bellows 254 which is in communication with the bottle will cause the upstanding pin 248 to be moved to the right viewing Fig. 7, thus releasing the arm 206 and permitting the same to be rocked to effect release of the rejecting mechanism when the unit reaches the testing point in the cycle.

Referring now to Figs. 3 and 4, air may be supplied to the bellows 252, 254 of each testing unit 76 from any suitable source, such as an air compressor, connected by a flexible pipe 256 to the lower end of the stationary central shaft 90, the latter having a central opening 91 therein. The upper end of the shaft 90 is provided with lateral openings 258 arranged to communicate with a pressure chamber 260 formed in a turret 262 rotatably mounted on the upper end of the shaft. As best shown in Fig. 3, the turret is directly connected by a plurality of radially extended rigid air pipes 264 to each individual testing unit 76, one end of each pipe 264 communicating with the chamber 260 and the other end connected to a valve unit 266 attached to and movable with the bracket 136. In operation, the rigid pipe connection causes the turret 262 to rotate on the central shaft 90 with the testing units 76.

Figure 9:
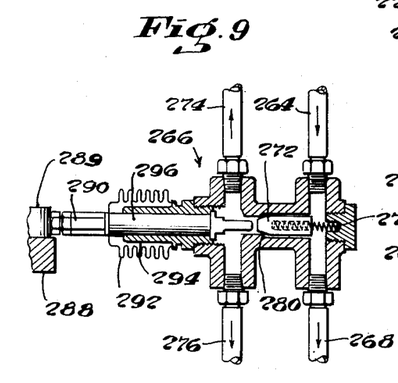
Fig. 9 is a cross sectional view taken on the line 9—9 of Fig. 7.

The pressure line to the bellows 252 is continued through a flexible pipe 268 connected to a tubular member 270 to which the bellows 252 is connected. The tubular member 270 is supported from the underside of the bracket 136 and in alignment with the opposing bellows 254. The bellows 254 is arranged to be supplied with air from the pressure line 264 through the valve unit 266 which latter is provided with a valve stem 272 slidingly mounted therein and arranged to be opened after the bottle has been sealed to admit air into separate upper and lower pipes 274, 276 leading to the bottle and to the bellows 254 respectively. As shown in Fig. 9, the valve stem 272 is normally urged by a spring 278 into engagement with a valve seat 280, and is arranged to be opened at a predetermined point in the cycle of operation by a stationary cam 282 adjustably secured to a flanged portion 284 of the sleeve member 139 attached to the stationary shaft 90, as illustrated in Fig. 3.

Figure 8:
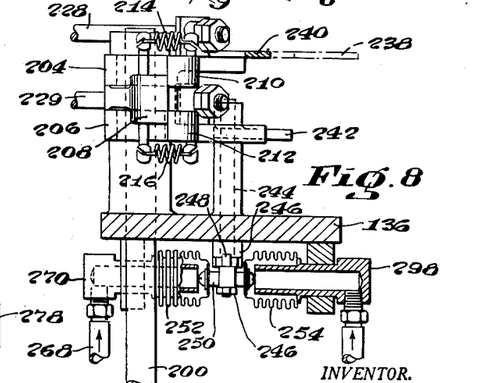
Fig. 8 is a cross sectional view taken on the line 8—8 of Fig. 7.

The cam 282 is arranged to cooperate with a roller 286 carried by an arm 288 pivoted in the standard 146. The arm 288 is provided with an intermediate roller 289 arranged to cooperate with the end of a link 290 connected to the free end of an air bellows 292 secured to a tubular member 294 screwed into the valve unit 266. The link 290 is screwed into a rod 296 slidingly mounted within the tubular member 294 and is arranged to engage the end of the spring pressed valve stem 272. The roller 286 and associated linkage is urged to follow the cam 282 by the extension of the bellows 292, the latter providing a leak proof connection, and when the valve is opened, air is permitted to enter from the pressure line 264 through the upper pipe 274 to the sealed bottle and through the lower pipe 276 into the bellows 254, the latter comprising a flexible tube connected to a tubular member 298 to which the bellows 254 is attached, as shown in Fig. 8.

Referring now to Figs. 4 and 5, the upper pipe 274 leading from the valve unit 266 is connected at its upper end by a flexible tube 300 to the upper end of the testing spindle 128 and in communication with a central opening 302 therein. The lower end of the hollow spindle is arranged to communicate with the bottle through a central passageway 304 formed in a stem 306 extended from and forming a part of the head portion 130, and through radial ports 308 arranged to be opened when the bottle is sealed.

The bottle sealing unit indicated generally at 132 is arranged to come to rest against the mouth of the bottle when the spindle is lowered into operative engagement therewith by gravity and thereafter, when positive sealing pressure is applied through the latch mechanism 170, 178 and associated linkage, provision is made for permitting relative movement between the spindle 128 and the sealing unit to effect uncovering of the ports 308. As clearly shown in Fig. 5, the stem 306 is adjustably supported in a shouldered member 310 screwed into the end of the spindle 128, the stem being retained in its adjusted position by a set screw 312. The sealing unit includes a flanged sleeve 314 slidably mounted on the stem 306 which is urged downwardly against a shoulder formed by the head 130 by a compression spring 316 interposed between the shouldered member 310 and the upper end of the sleeve 314. The flanged portion 318 of the slidable sleeve 314 is grooved to receive a resilient washer 320 and a second washer or sealing member 321 for engagement with the mouth of the bottle is retained in the unit by a threaded cap member 322 cooperating with the flange 318. The shouldered member 310 is also provided with a resilient washer 324 fitted into a groove in the underside thereof and arranged to cooperate with an annular rib 326 formed on the upper surface of the flange 318. A sealing washer 328 may also be provided on the shoulder formed by the head 130 for sealing engagement with the end of the sleeve 314.

With this construction it will be seen that in operation, when the head portion 130 of the spindle is permitted to enter the bottle and the sealing member 321 engages the mouth thereof, positive pressure is applied by the latch mechanism 170, 178 to extend the stem 306 and head 130 relative to the sleeve 314 to thereby uncover the ports 308. At the same time a seal is made between the shouldered member 310 and the flanged portion 318 to cut off possible escape of air between the sleeve 314 and the stem 306. Thus, the bottle is firmly sealed from the atmosphere during the testing operation.

In the operation of the leakage testing mechanism, the valve 272 is opened by the stationary cam 282 at a point in the cycle indicated at 330 in Fig. 2 and shortly thereafter the valve 272 is again closed to seal the air pressure within the bottle. Prior to sealing and subjecting the bottle to the air pressure, the latch member 242 is urged into an outwardly rocked position, as shown in dotted lines in Fig. 6, due to the constant pressure maintained in the bellows 252. As soon as the valve 272 is opened and pressure is applied to the bottle being tested, the latch 242 will be moved into engagement with the latch arm 206 because of equalization of pressure in the bellows 252, 254. Thereafter, during the time interval between subjecting the bottle to pressure, as indicated at 330 and the testing point indicated at 239, if the bottle is unable to maintain the pressure applied thereto, the bellows 254 will be overcome by the bellows 252 and thus cause the latch member 242 to be again rocked out of operative engagement with the arm 206. Thus, when the testing cam 218 operates to rock the arm 206 there will be no resistance to such movement and the rejecting mechanism will be released, as above described. On the other hand, if the pressure is maintained in the bottle, the latch 242 will remain in locked engagement with the arm 206 and thus prevent release of the rejecting mechanism.

From the above description it will be observed that in the operation of the bottling apparatus, the line of bottles 12 on the supply conveyer 14 are successively transferred to the rotary bottle testing apparatus 10 and in alignment with individual testing units 76. During the progress of the bottle through the testing machine, the testing spindle 128 is lowered into operative engagement with the bottle. If the spindle is prevented from descending into sealing engagement with the bottle because of any of the defects hereinbefore noted the height gauge or stop member 238 will not be in alignment with the cam operated feeler arm 204 and the rejecting mechanism will be released when the unit arrives at the testing point 239 to effect rejection of the defective bottle onto the turntable 20 after the testing spindle has been withdrawn.

If the bottle passes this test and the spindle is lowered into sealing engagement with the bottle, the arm 204 will be prevented from rocking and the rejecting mechanism will not be released by the action of the arm 204. However, in the event that a leak is detected in the bottle when the spindle is lowered into sealing engagement therewith, the arm 206 may effect release of the rejecting mechanism. Such action is effected by subjecting the sealed bottle to pressure by air admitted therein when the valve 272 is opened, the valve being immediately closed to lock the air in the bottle. If the pressure in the bottle is not maintained during the interval between the application of pressure and the testing point 239 the latch 242 will be moved to permit the cam operated arm 206 to be rocked to release the rejecting mechanism at the testing point 239. Thus the rejecting mechanism may be rendered operative by either failure of the spindle 128 to descend or failure of the bottle to maintain an initially applied pressure, both tests being made simultaneously at the testing point 239.

It will also be observed that the valve 272 is opened whether or not the spindle 128 descends in operative engagement with the bottle and that when the spindle fails to descend, the air admitted to the spindle may escape through the closed ports 308 upwardly between the relatively movable parts 306, 314 and out to the atmosphere since no seal is made between the parts 310, 318 when the spindle fails to descend into sealing engagement with the bottle. The air escaping in this manner is sufficient to effect a reduction in pressure in the bellows 254 and thus effect release of the rejecting mechanism. In other words, in one aspect of the invention the pneumatic control means alone may be utilized to detect defects of any nature including misshapen bottles and leaky bottles since failure of the spindle to descend will effect a reduction in pressure in the bellows 254 and consequent rejection of the bottle through release of arm 206. It will be further observed that if the bottle is substantially shorter than a predetermined standard height there will be no relative movement between the parts 310, 318 to seal the space therebetween and a reduced pressure will result to effect subsequent rejection of the bottle.

In the continued operation of the bottling apparatus, those bottles which pass all the tests are transferred from the testing machine by the spider 15 to be delivered to the operating mechanism of the bottling apparatus to be cleaned, filled and closed, the present testing mechanism assuring that each bottle delivered to the bottling apparatus will pass freely through the operating mechanism without injury to the machine or breakage of the bottles.

While the preferred embodiment of the invention has been herein illustrated and described, it will be understood that the invention may be embodied in other forms within the scope of the following claims.

Having thus described the invention, what is claimed is:

1. Bottle testing apparatus adapted for use in testing bottles being supplied to a bottling machine, comprising detecting means comprising a vertically reciprocable member having portions engageable with the body, neck opening and top of the bottle, said reciprocable member being mounted to permit termination of descent when obstructed by a non-uniform portion of the bottle, a normally locked bottle rejecting mechanism, and control means including a cam operated arm arranged to release said rejecting mechanism when descent of the reciprocable member is terminated by engagement with a non-uniform bottle, and a stop member carried by said reciprocable member arranged to engage said arm to prevent release of the rejecting mechanism when the member is permitted to descend to a predetermined position.

2. Bottle testing apparatus adapted for use in testing bottles being supplied to a bottling machine, comprising a reciprocable member having portions engageable with different parts of the bottle, said reciprocable member being mounted to permit termination of movement when obstructed by a non-uniform bottle, means carried by said reciprocable member for sealing the mouth of the bottle, means for subjecting the bottle to a predetermined air pressure while thus sealed, means for indicating a loss in such pressure, a normally locked bottle rejecting mechanism, and unitary control means arranged to release said rejecting mechanism when said reciprocable member is terminated in its movement by a non-uniform bottle or when a loss in pressure is indicated whereby to protect the bottling apparatus from damage by such defective bottles, said control means including a mechanically operated arm arranged to cooperate with a portion of said reciprocal member to prevent operation of said rejecting mechanism when a uniform bottle is detected, and a pneumatically operated latch for restraining said arm when the bottle maintains said predetermined pressure.

3. In bottling apparatus of the character described, in combination, bottle testing means including means for detecting a leaky bottle, said detecting means comprising a vertically reciprocable member having an air nozzle insertable into the bottle and a sealing member engageable with the mouth of the bottle, said reciprocable member being mounted to descend freely by gravity until the sealing member engages the mouth of the bottle, means for thereafter applying positive pressure to seal the bottle, means for subjecting the bottle to a predetermined air pressure through said nozzle, means for indicating a loss in such pressure, a normally locked rejecting mechanism, and control means arranged to release said rejecting mechanism when a pressure loss is indicated, said positive pressure applying means including a pivotally mounted arm operatively connected to said vertically reciprocal member, and a cam operated arm arranged for cooperation with said pivotally mounted arm to effect said sealing pressure when the reciprocal member engages the mouth of the bottle.

4. In bottling apparatus of the character described, in combination, bottle testing means including means for detecting a leaky bottle, said detecting means comprising a vertically reciprocable member having an air nozzle insertable into the bottle and a sealing member engageable with the mouth of the bottle, said reciprocable member being mounted to descend freely by gravity until the sealing member engages the mouth of the bottle, means for thereafter applying positive pressure to seal the bottle, means for subjecting the bottle to a predetermined air pressure, said nozzle having a port, said sealing member being mounted for movement relative to the reciprocable member when positively urged into sealing engagement to uncover said port, means for indicating a loss in such pressure, a normally locked rejecting mechanism, and control means arranged to release said rejecting mechanism when a pressure loss is indicated.

5. Bottle testing apparatus comprising, means for continuously conveying a line of successive bottles through said apparatus along a fixed path, a testing unit for each bottle in said apparatus, said testing units each being continuously moveable along said path with said bottles and each including means for engaging and gauging said bottles for deformities in concentricity, obstructed neck openings, height and leaks while moving through said apparatus, said units being moveable toward and from testing proximity to said bottles during said continuous movement, a rejecting mechanism associated with each testing unit, each of said rejecting mechanisms being respectively controlled by its associated testing unit to remove defective bottles from said line at a single predetermined station along the path of movement of said bottles through said apparatus.

6. Apparatus as defined in claim 5 wherein said rejecting mechanisms include means regularly and periodically urging a rejecting element in bottle rejecting movement at said station, a moveable blocking element moveable to a position to prevent movement of said rejecting element, and means responsive to said testing unit for moving said blocking element to said position when said testing unit detects an acceptable bottle.

7. Bottle testing apparatus comprising, means for continuously conveying a line of successive bottles through said apparatus along a fixed path, a testing unit for each bottle in said apparatus, said testing units each being continuously moveable with said bottles and including means for applying superatmospheric pressure to the interiors of said bottles, a source of superatmospheric pressure, a pair of opposed expansible chambers, means providing communication between one of said chambers and the interior of a bottle and the interior of said bottle and said source of pressure, means providing communication between the other chamber and said source of pressure, a control element responsive to pressure differences in said chambers, a rejecting mechanism associated with each testing unit, each of said rejecting mechanisms being respectively controlled by its associated control element to remove leaking bottles from said line at a single predetermined station along the path of movement of said bottles through said apparatus.

WALTER BERTHELSEN.

REFERENCES CITED

The following references are of record in the file of this patent:

UNITED STATES PATENTS

| Number | Name | Date |
|---|---|---|
| 1,316,549 | Winkley | Sept. 16, 1919 |
| 1,960,151 | Gray | May 22, 1934 |
| 2,020,535 | Cameron | Nov. 12, 1935 |
| 2,061,744 | Temple | Nov. 24, 1936 |
| 2,293,586 | Bardet et al. | Aug. 18, 1942 |
| 2,307,957 | Reynolds | Jan. 12, 1943 |
| 2,352,091 | Fedorchak | June 20, 1944 |
| 2,407,062 | Darrah | Sept. 3, 1946 |
| 2,418,949 | McNally | Apr. 15, 1947 |
| 2,432,871 | Fedorchak et al. | Dec. 16, 1947 |
| 2,433,043 | Gray | Dec. 23, 1947 |